Patented Dec. 15, 1931

1,836,486

UNITED STATES PATENT OFFICE

HAROLD A. MORTON, OF AKRON, OHIO

MANUFACTURE OF AROMATIC DERIVATIVES OF 1-2 DIAMINO ETHANE

No Drawing.   Application filed July 3, 1928.   Serial No. 290,278.

This invention relates to improvements in the method of production of aromatic derivatives of 1-2 di amino ethane by the reaction of 1-2 dihalogen ethanes, and aromatic amines, preferably 1-2 di (phenyl amino) ethane, by the reaction of 1-2 dihalogen ethanes and aniline.

1-2 di (phenyl amino) ethane is a white solid having a melting point of approximately 65° C. It is sometimes referred to in the literature as 1-2 di anilino ethane and has the chemical formula of:

$C_6H_5NHCH_2CH_2NHC_6H_5$.

When a 1-2 dihalogen ethane reacts with an excess of aniline, 1-2 di (phenyl amino) ethane is formed, mixed with by-products of 1-2 di (phenyl amino) ethane hydrohalide and aniline hydrohalide.

It has been suggested as a mere laboratory experiment that 1-2 di (phenyl amino) ethane may be prepared by the reaction of one mol of ethylene dibromide or dichloride and four mols of aniline, by heating at a temperature of approximately 140° C.

In this method considerable difficulty would be experienced in the preparation and purification of the product, were it carried out on a commercial scale, because the reaction is a very violent one and considerable difficulty would be experienced in condensing the ethylene dichloride during the most vigorous part of the reaction.

The method of handling and purification would also be a very laborious and tedious procedure.

For example, in the suggested scheme, the reaction mixture was heated until solidification took place, forming a solid cake in the reaction container. This was then treated with caustic soda, giving a mixture of 1-2 di (phenyl amino) ethane, aniline and sodium chloride. Such mixture was then distilled to separate the aniline, and the 1-2 di (phenyl amino) ethane was further purified by treatment with sulphuric acid to form the insoluble sulphate of the base, which was then recrystallized. The free base was then obtained from the sulphate.

By my invention the conditions are so controlled that these difficulties do not exist and the method of preparation and purification is greatly simplified.

By my procedure the reaction is completed before solidification takes place, and the reaction mixture is discharged from the reaction kettle and purified while still in a molten condition. This entails a great saving of time and labor.

The present invention consists in heating one mol of 1-2 dichlor ethane with four mols of aniline in the presence of a small quantity of water, and preferably a considerable quantity of 1-2 di (phenyl amino) ethane.

The reaction, if conducted at atmospheric pressure, is carried out in an acid resisting container equipped with a suitable reflux condenser, for returning to the reaction mixture the condensed dichlor ethane, aniline and water. If carried out under an appropriate super-atmospheric pressure, the reflux apparatus is unnecessary.

The heating is preferably carried out with steam at approximately ten pounds per square inch, (115° C.). It has been found that the presence of a small quantity of water retards the rate of reaction considerably, resulting in less rapid evolution of heat, thus causing the reaction to be much less violent. The quantity of water may be varied so that the temperature of the reaction mixture may be controlled within desired limits.

The addition of 1-2 di (phenyl amino) ethane to the original reaction mixture serves a double purpose. In the first place it has been found to retard the rate of reaction slightly, although the effect is not as great as that shown by water.

The main purpose of this addition of 1-2 di (phenyl amino) ethane is that the concentration of this base is increased with respect to the aniline hydrochloride. This results in lowering the melting point of the final reaction mixture and also apparently increases the solubility of the aniline hydrochloride, thereby reducing the danger of solidification.

It has also been found that the violence of the reaction may be diminished by adding the dichloride in increments. In other words, only a portion of the 1-2 dichlor ethane is added to the reaction kettle initially, and after the violence of this reaction has diminished, further additions of dichloride are made.

It has been found that the resulting reaction mixture can be very easily purified by extracting the mixture several times with a large quantity of hot water. This treatment results in the extraction of aniline hydrochloride and 1-2 di (phenyl amino) ethane hydrochloride from the reaction mixture, leaving practically pure 1-2 di (phenyl amino) ethane.

The aqueous solution of the mixed hydrochlorides is then treated with a suitable quantity of caustic soda or any other alkaline neutralizing agent and the resulting aniline and 1-2 di (phenyl amino) ethane is recovered as a mixture. This recovered aniline which contains approximately 15 to 25 percent of 1-2 di (phenyl amino) ethane is utilized in the next reaction mix to replace aniline and the 1-2 di (phenyl amino) ethane affects the reaction as described above.

The invention will be further illustrated by the following specific example, although it is to be understood that the invention is not limited thereto.

Into a 200 gallon steam jacketed, glass-lined kettle connected with a reflux condenser and equipped with a recording thermometer, is introduced 935 pounds of aniline, 135 pounds of 1-2 dichlor ethane, 85 pounds of 1-2 di (phenyl amino) ethane, and 10 pounds of water. The mixture is then heated at ten pounds steam pressure (115° C.) and after some little time the temperature rises sharply to approximately 155° C., due to the strong exothermic reaction taking place within the kettle. After some few minutes the temperature begins to fall off rather rapidly, at which time 60 pounds of 1-2 dichlor ethane is added to the contents of the kettle. The temperature of the mixture again rises, reaching approximately 160° C., and after a few minutes again begins to drop off rather sharply. As soon as the drop in temperature begins to occur, an additional 60 pounds of 1-2 dichlor ethane is again added and the temperature rises to approximately 165° C.

This completes the addition of 1-2 dichlor ethane and the contents of the kettle are then allowed to stand for approximately one-half hour. At this point the temperature has dropped to approximately 155° C. and the reaction mixture is discharged while at this temperature and in liquid form, into approximately 220 gallons of water, previously heated to a temperature of about 40–45° C. This water is contained in a cylindrical tank of about 450 gallons capacity, equipped with a mechanical agitator capable of producing vigorous stirring.

After the contents of the kettle have been discharged, the temperature of the aqueous mixture is approximately 65–70° C. This mixture is then well mixed for several minutes by agitation, whereupon the stirring is discontinued. The resulting mixture consists of an aqueous solution containing aniline hydrochloride and 1-2 di (phenyl amino) ethane hydrochloride, and molten 1-2 di (phenyl amino) ethane in suspension. The mixture is allowed to settle for approximately two to four hours, whereupon the molten 1-2 di (phenyl amino) ethane settles to the bottom of the tank. At the end of this settling period, the upper aqueous layer is separated from the 1-2 di (phenyl amino) ethane layer by means of suction or by any other convenient method. That is, the upper layer consisting of a solution of the mixed hydrochlorides is separated and transferred during this process to a second tank, where the aniline containing 1-2 di (phenyl amino) ethane is recovered.

The 1-2 di (phenyl amino) ethane is then purified by several treatments with hot water to dissolve out any remaining hydrochlorides which it may contain, and after each washing and settling, the upper aqueous layer is separated as before.

The residue left in the first tank is practically pure 1-2 di (phenyl amino) ethane in a molten condition. This material may now be solidified, if desired, by the addition of cold water during very vigorous agitation. The more rapid the agitation during this solidification process, the more finely divided the resulting material. It may then be filtered and dried in an oven at a temperature which does not exceed 60° C.

If desired, instead of solidifying with cold water, the molten material may be drawn off in suitable receptacles and solidified in the form of blocks which may then be crushed and ground. If done in this manner, drying is not essential or at least, the drying process is greatly simplified.

If it is desired, the number of washings with hot water may be reduced and the small amount of aniline hydrochloride remaining in the material may be neutralized by the addition of caustic soda. This, however, gives a product which is not quite as pure.

In some cases it may also be desirable, after the first washing has been made, to add a small quantity of acid to the second wash, thus eliminating traces of free aniline present in the reaction mixture.

The aqueous solution of aniline hydrochloride and 1-2 di (phenyl amino) ethane hydrochloride which is recovered during the process of washing, is treated with the requisite quantity of caustic soda to effect neutralization, thus liberating free aniline and 1-2 di (phenyl amino) ethane. The latter material being very soluble, dissolves in the aniline.

On allowing the neutralized liquor to settle for a period of time, a separation occurs and the aniline layer may be readily separated. The aqueous layer containing considerable quantities of sodium chloride also contains small quantities of aniline, which may be recovered, if desired, by any of the known methods.

In general, the aniline recovered in the process contains approximately 15 to 25 percent of dissolved 1-2 di (phenyl amino) ethane and this recovered aniline is used over again in the process to replace fresh aniline.

For example, about 500 pounds of aniline mixture is recovered from the above batch and this aniline contains approximately 85 pounds of 1-2 di (phenyl amino) ethane dissolved in it. This aniline is then used for the next batch to replace approximately 415 pounds of aniline.

The amount of 1-2 di (phenyl amino) ethane obtained by the above process is practically the theoretical quantity (about 540 pounds) and is of a fairly high degree of purity without further treatment. The aniline recovery is also very efficient.

It is possible to modify the procedure somewhat as regards to the amount of water used in the reaction. In general, however, the rapidity of the reaction is dependent upon the amount of water employed and it should not be increased beyond that necessary. In fact, it is possible to increase the water to the point where the reaction is slowed down to such an extent as to be almost negligible in rate.

It is also possible to change the rate of addition of 1-2 dichlor ethane and in general the rate of addition can be increased as the water is increased, and the opposite is also true.

It is also possible to use slightly less than four mols of aniline in the reaction, although the most efficient method is to employ about the same ratio of quantities as given in the above example.

It is also possible, if desired, to use 1-2 dibrom ethane in place of 1-2 dichlor ethane.

The procedure described for the manufacture of 1-2 di (phenyl amino) ethane may also be used in the manufacture of other substituted amino ethanes. For example, 1-2 di (ortho tolyl amino) ethane, 1-2 di (para tolyl amino) ethane and many other materials of this type which are prepared by heating 1-2 dichlor ethane with an excess of an aromatic amine, can be prepared following substantially the described procedure.

What I claim is:

1. A method of preparing 1-2 di (aryl amino) ethane, comprising the steps of heating 1-2 dihalogen ethane with an excess of aromatic amine having a replaceable amino hydrogen atom over the amount theoretically necessary to form 1-2 di (aryl amino) ethane, until equilibrium has been substantially attained, and removing the reaction mixture from the reaction vessel while still in a liquid condition.

2. A method of preparing di (phenyl amino) ethane, comprising the steps of heating 1-2 dihalogen ethane with an excess of aniline over the amount theoretically necessary to form di (phenyl amino) ethane, until equilibrium has been substantially reached, and then removing the reaction mixture from the reaction vessel while still in a liquid state.

3. A method of preparing 1-2 di (phenyl amino) ethane involving heating a 1-2 dihalogen ethane with an excess of aniline over the amount theoretically necessary to form 1-2 di (phenyl amino) ethane, discharging the reaction mixture from the reaction vessel, while still in a liquid condition, into water, and then further purifying the product.

4. In a method for preparing 1-2 di (phenyl amino) ethane, the step which comprises adding to a reaction mixture of aniline and 1-2 dihalogen ethane, a quantity of 1-2 di (phenyl amino) ethane.

5. A method of preparing 1-2 di (phenyl amino) ethane comprising heating 1-2 dichlor ethane with an excess of aniline over the amount theoretically necessary to produce 1-2 di (phenyl amino) ethane, recovering the excess aniline containing some dissolved 1-2 di (phenyl amino) ethane, and utilizing the same in a new reaction mixture.

6. In a method for preparing 1-2 di (phenyl amino) ethane, the step which comprises heating a reaction mixture of 1-2 dihalogen ethane and an excess of aniline over the amount theoretically necessary to produce 1-2 di (phenyl amino) ethane, in the presence of a relatively small amount of water insufficient to prevent the reaction.

7. A method for preparing 1-2 di (phenyl amino) ethane which comprises heating 1-2 dichlor ethane with an excess of aniline over the amount theoretically necessary to produce di (phenyl amino) ethane, in the presence of a relatively small amount of water insufficient to prevent the reaction, recovering the excess aniline containing some dissolved 1-2 (phenyl amino) ethane, and utilizing it in a new reaction mixture.

8. In a method for preparing 1-2 di (phenyl amino) ethane, the step which comprises adding to a mixture of dihalogen ethane, an excess of aniline over the theoretical amount necessary to form 1-2 di (phenyl amino) ethane, and a relatively small amount of water insufficient to prevent the reaction, and a quantity of di (phenyl amino) ethane.

9. A method which comprises reacting dichlor ethane and an excess of aniline over the amount required to produce 1-2 di (phenyl amino) ethane, in the presence of a relatively small amount of water insufficient to prevent the reaction and a substantial quantity of di (phenyl amino) ethane, and recovering the excess aniline containing dissolved therein an appreciable amount of di (phenyl amino) ethane.

10. A method of preparing 1-2 di (phenyl amino) ethane involving heating 1-2 dichlor ethane with an excess of aniline, over the amount theoretically necessary to form 1-2 di (phenyl amino) ethane, discharging the reaction mixture while still in a liquid condition into water, purifying the 1-2 di (phenyl amino) ethane by further treatment with water, and recovering the aniline containing 1-2 di (phenyl amino) ethane, substantially as described.

11. A method of preparing 1-2 di (phenyl amino) ethane, comprising heating 1-2 dichlor ethane with an excess of aniline over the amount theoretically necessary to produce 1-2 di (phenyl amino) ethane, the dichlor ethane being added at intervals throughout the reaction, continuing the reaction until equilibrium has been reached and then removing the reaction mixture from the reaction vessel while still in a liquid condition.

12. A method of preparing 1-2 di (phenyl amino) ethane involving heating 1-2 dichlor ethane with an excess of aniline over the amount theoretically necessary to form 1-2 di (phenyl amino) ethane in the presence of 1-2 di (phenyl amino) ethane and a relatively small amount of water insufficient to prevent the reaction, the 1-2 dichlor ethane being added at intervals throughout the action, substantially as described.

13. A method of preparing 1-2 di (phenyl amino) ethane which comprises heating 1-2 dichlor ethane with an excess of aniline over the amount theoretically necessary to produce di (phenyl amino) ethane, carrying the reaction to completion, and purifying the product while still in the liquid phase.

14. In a method for preparing 1-2 di (aryl amino) ethane, the step which comprises adding to a reaction mixture containing one mol of dihalogen ethane, and an excess over two mols of aromatic amine having a replaceable amino hydrogen atom, a substantial quantity of di (aryl amino) ethane.

15. A method for preparing di (aryl amino) ethane which comprises reacting one mol of dihalogen ethane with an excess over two mols of aromatic amine having a replaceable amino hydrogen atom in the presence of a quantity of di (aryl amino) ethane, recovering the excess amine containing dissolved therein 1-2 di (aryl amino) ethane, and returning it to the reaction vessel to utilize in a fresh reaction mixture.

16. A method of preparing 1-2 di (aryl amino) ethane including heating one mol of 1-2 dihalogen ethane with an excess over two mols of aromatic amine having a replaceable amino hydrogen atom in the presence of 1-2 di (aryl amino) ethane and a relatively small amount of water insufficient to prevent the reaction, and recovering the excess aromatic amine containing dissolved 1-2 di (aryl amino) ethane.

17. A method of preparing 1-2 di (aryl amino) ethane involving heating 1-2 dihalogen ethane with an excess of aromatic amine having a replaceable amino hydrogen atom and said aromatic amine being over the amount theoretically necessary to form 1-2 di (aryl amino) ethane, discharging the reaction mixture from the reaction vessel while still in a liquid condition into water, and then further purifying the product.

18. A method of preparing 1-2 di (aryl amino) ethane comprising the steps of heating one mol of 1-2 dihalogen ethane with more than two mols of aromatic amine having a replaceable amino hydrogen atom and removing the reaction mixture from the reaction vessel at a temperature above the melting point of the 1-2 di (aryl amino) ethane and while the 1-2 di (aryl amino) ethane is supersaturated with respect to the amine hydrohalide.

19. A method of preparing 1-2 di (phenyl amino) ethane comprising heating 1-2 dihalogen ethane with more than two mols of aniline, discharging the reaction mixture from the reaction vessel at a temperature above the melting point of the 1-2 di (phenyl amino) ethane while the 1-2 di (phenyl amino) ethane is supersaturated with respect to aniline hydrohalide, into water and removing the aniline hydrohalide before the material solidifies.

20. A method of preparing a 1-2 di (aryl amino) ethane comprising heating a 1-2 dihalogen ethane with more than two mols of aromatic amine, and removing the aniline hydrohalide while the material is still in the liquid phase.

In testimony whereof, I affix my signature.
HAROLD A. MORTON.